United States Patent
Hetherington et al.

(10) Patent No.: US 7,489,144 B2
(45) Date of Patent: Feb. 10, 2009

(54) LOW-COST LINEAR AND LIQUID POSITION TRANSDUCERS

(75) Inventors: Jack Hetherington, Haslett, MI (US); Michael Hetherington, Williamston, MI (US)

(73) Assignee: P.I. Engineering, Inc., Williamston, MI (US)

( * ) Notice: Subject to any disclaimer, the term of this patent is extended or adjusted under 35 U.S.C. 154(b) by 10 days.

(21) Appl. No.: 11/355,279

(22) Filed: Feb. 15, 2006

(65) Prior Publication Data

US 2006/0192569 A1    Aug. 31, 2006

Related U.S. Application Data

(60) Provisional application No. 60/653,293, filed on Feb. 16, 2005.

(51) Int. Cl.
*G01R 27/26* (2006.01)
(52) U.S. Cl. .................................. 324/662; 324/663
(58) Field of Classification Search ................ 324/662, 324/671, 663; 73/718, 724
See application file for complete search history.

(56) References Cited

U.S. PATENT DOCUMENTS

| | | | | |
|---|---|---|---|---|
| 2,746,295 A * | 5/1956 | Lubkin | .................. | 73/749 |
| 3,540,277 A * | 11/1970 | Roth et al. | ................ | 73/335.04 |
| 4,814,657 A * | 3/1989 | Yano et al. | .................. | 310/309 |
| 5,611,240 A * | 3/1997 | Yamaguchi | ............... | 73/304 C |
| 6,204,669 B1 * | 3/2001 | Beard et al. | .................. | 324/557 |
| 2004/0187589 A1 * | 9/2004 | Ferran et al. | ................... | 73/718 |
| 2005/0217369 A1 * | 10/2005 | Holappa et al. | ............ | 73/304 C |

* cited by examiner

*Primary Examiner*—Vincent Q Nguyen
(74) *Attorney, Agent, or Firm*—Gifford, Krass, Sprinkle, Anderson & Citkowski, P.C.

(57) ABSTRACT

Cost-effective methods and apparatus are disclosed for measuring both absolute position and fluctuations using a moving dielectric medium between fixed electrodes. A position sensor according to the invention includes a pair of spaced-apart electrodes, an elongated dielectric that moves between the electrodes, and electrical circuitry interconnected to the electrodes to determine the position of the dielectric relative to the electrodes. To realize a linear position sensor, the electrodes are electrically conductive rods or wires, and the dielectric is also an electrically non-conductive rod or wire. The dielectric may be flexible or stiff, in which case the dielectric and the electrodes are preferably substantially parallel to one another. Alternatively, the spaced-apart electrodes may be concentric tubes, with the dielectric being an electrically non-conductive tube slideably disposed between the electrodes. In different embodiments, the dielectric is a liquid-receiving tube. The tube may be straight, forming part of a level sensor or curved, forming part of a rotation sensor or manometer.

6 Claims, 3 Drawing Sheets

LOW-COST LINEAR AND LIQUID POSITION TRANSDUCERS

REFERENCE TO RELATED APPLICATION

This application claims priority to U.S. Provisional Patent Application Ser. No. 60/653,293, filed Feb. 16, 2005, the entire content of which is incorporated herein by reference.

FIELD OF THE INVENTION

This invention relates generally to position sensors and, in particular, to low-cost linear and liquid position transducers.

BACKGROUND OF THE INVENTION

Measuring position is important for many human and servo control systems. Various methods exist to measure position. Many are rotary and some are directly linear. Linear designs are often costly or not entirely durable for high-frequency fluctuations in a small area. Inexpensive sensors such as potentiometers suffer from wear of the contact against the resistive medium. This is particularly problematic in situations where the transducer is continuously vibrating such as a simulator platform. Other systems, such as LVTs (linear velocity transformers), rely on a moving sensor and are not suited to measuring absolute position. Sill other systems are very accurate, such as the various precision systems used in CNC servo control, but are quite costly.

SUMMARY OF THE INVENTION

This invention is directed to cost-effective methods and apparatus for measuring both absolute position and fluctuations using a moving dielectric medium between fixed electrodes.

A position sensor according to the invention includes a pair of spaced-apart electrodes, an elongated dielectric that moves between the electrodes, and electrical circuitry interconnected to the electrodes to determine the position of the dielectric relative to the electrodes.

To realize a linear position sensor, the electrodes are electrically conductive rods or wires, and the dielectric is also an electrically non-conductive rod or wire. The dielectric may be flexible or stiff, in which case the dielectric and the electrodes are preferably substantially parallel to one another.

Alternatively, the spaced-apart electrodes may be concentric tubes, with the dielectric being an electrically non-conductive tube slideably disposed between the electrodes.

In different embodiments, the dielectric is a liquid-receiving tube. The tube may be straight, forming part of a level sensor or curved, forming part of a rotation sensor or manometer.

DETAILED DESCRIPTION OF THE INVENTION

This invention resides in cost-effective methods and apparatus for measuring both absolute position and fluctuations using a moving dielectric medium between fixed electrodes. There are at least four basic embodiments of this invention:
1) sliding semi-flexible dielectric rod constrained between two electrodes;
2) sliding dielectric lump between two or more electrodes;
3) concentric sliding dielectric tube and electrode tubes; and
4) moving liquid between two or more electrodes.

Each of these embodiments will be described in turn.

Figure 1:
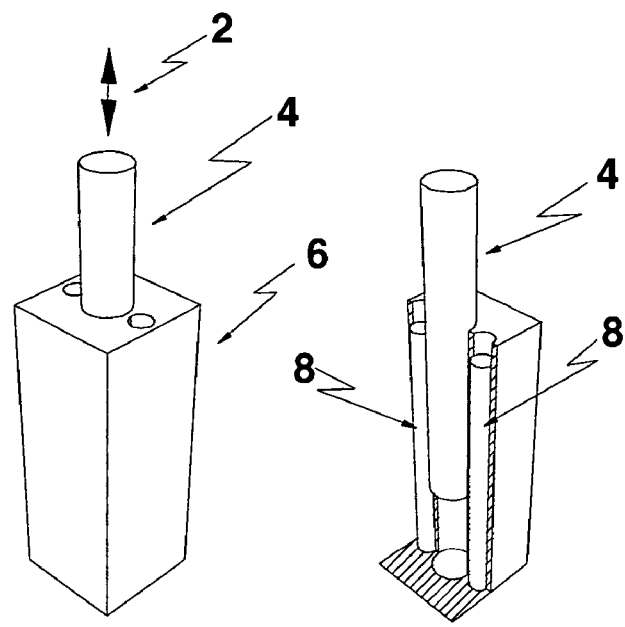
FIG. 1 is a drawing that shows a sliding semi-flexible dielectric rod constrained between 2 electrodes.

Sliding Semi-Flexible Dielectric Rod Constrained Between 2 or More Electrodes This embodiment of the invention is depicted in FIG. 1. A dielectric rod 2 is moved between 2 or more fixed electrodes 8. The rod 2 is constrained by an insulating tube 6 to maintain its basic position between the electrodes. As the rod 2 is moved between the electrodes, the capacitance between the electrodes changes and the position is determined from this change. In a simple construction of this embodiment, the dielectric "rod" is a stiff plastic string, such as the type used in rotating weed trimmers. The electrodes can be simple wires held in a plastic sleeve.

This version of the invention eliminates the need for a printed-circuit board (PCB) to create the electrodes plates. However, in a situation where a PCB is already available for other electronics, it could be used for one or both of the electrode plates.

Note that the actual path that the dielectric medium is constrained to move does not have to be straight, if the medium is flexible it can moved along a curved path so long as it is moved between the sensing electrodes.

Sliding Dielectric Lump Between Two or More Electrodes

In cases where the dielectric string is too small or weak to be pushed it may be desirable to pass a continuous piece of string with a larger dielectric piece that is pulled along the sensing area. In this configuration, the larger dielectric would be the object that changes the capacitance between the electrodes and the string would be constant diameter so it would not change the capacitance. This technique would preferably use several electrodes to accurately determine the position of the dielectric mass.

Figure 2:
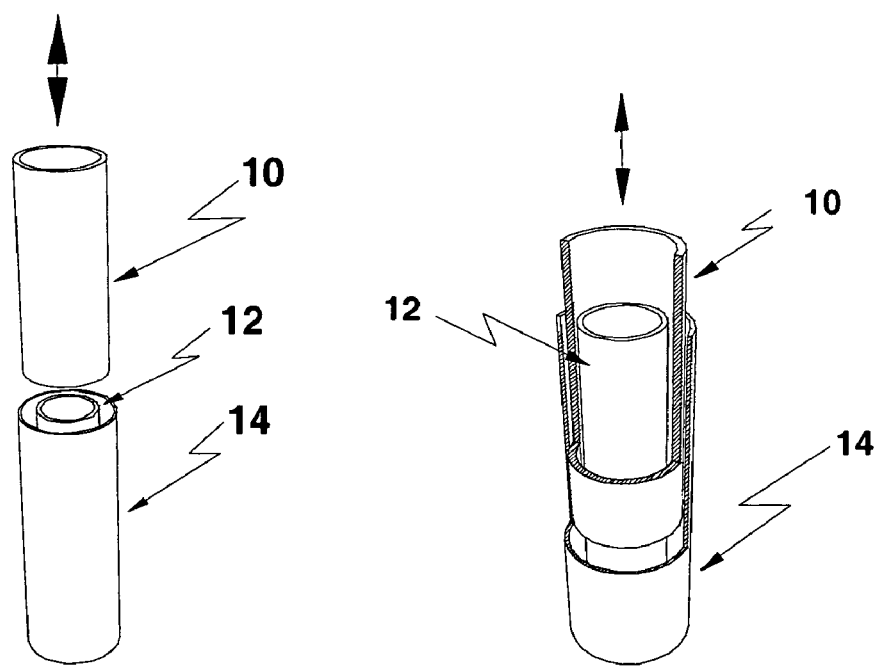
FIG. 2 is a drawing that shows concentric sliding dielectric tube and electrode tubes.

Concentric Sliding Dielectric Tube and Electrode Tubes

Where strong mechanical design and high accuracy is desired, two concentric metal tubes 12, 14 may be used as the electrodes as shown in FIG. 2. This provides a large area to sense the moving dielectric. The dielectric is also a tube 10 and slides between the two tubes. The two electrode tubes are fixed at the bottom and the dielectric tube maintains the position of the electrodes at the top.

Moving Liquid Between Two or More Electrodes

Figure 3:
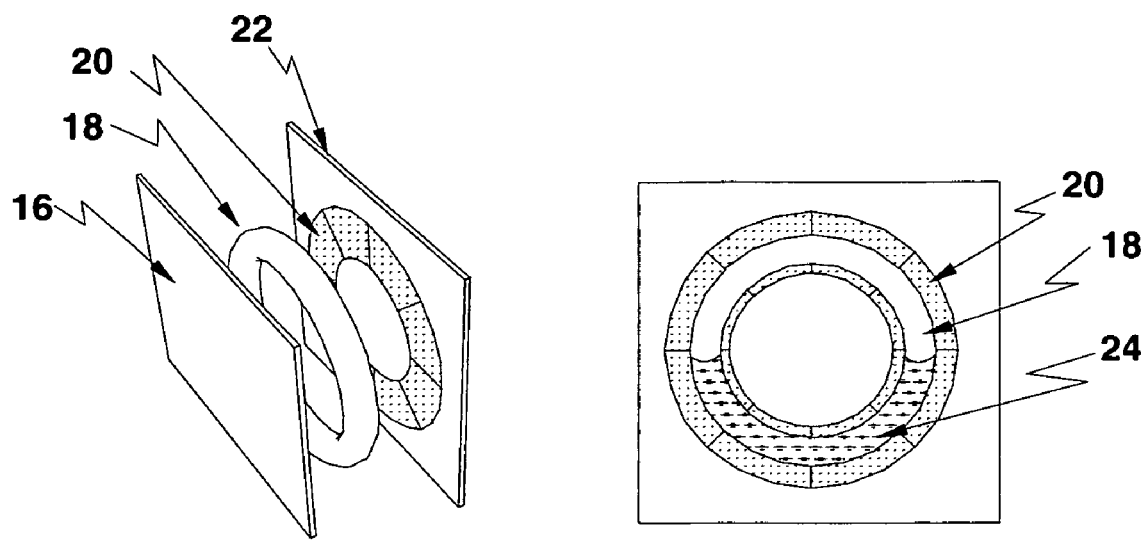
FIG. 3 is a drawing that shows a moving liquid between two or more electrodes.

The use of a liquid as the dielectric medium generates several useful applications of the moving dielectric concept, including but not limited to water level sensors, gas gauges, measurement apparatus, and so forth. Broadly, a hollow tube is placed between two or more electrodes, such that as a liquid displaces the gas in the tube the dielectric constant between the electrodes changes. This phenomenon can be applied in at least three ways:

A "tilt" sensor embodiment is shown in FIG. 3. A sealed tube 18 partially filled with a dielectric liquid 24, is placed between two plates 16, 18 containing two or more electrodes 20. This allows the angle of the assembly to be determined relative to gravity because the liquid 24 will always move to the bottom of the tube, thus changing the capacitance between the electrode arrays 20. Different viscosities of liquids can be used to avoid unwanted oscillations. Electronic circuitry and methods for determining position or orientation based upon the relationship between a moving dielectric and segmented electrodes may be found in U.S. patent application Ser. No. 09/684,205 and U.S. Pat. No. 6,888,076, the entire content of both references being incorporated herein by reference.

Figure 4:
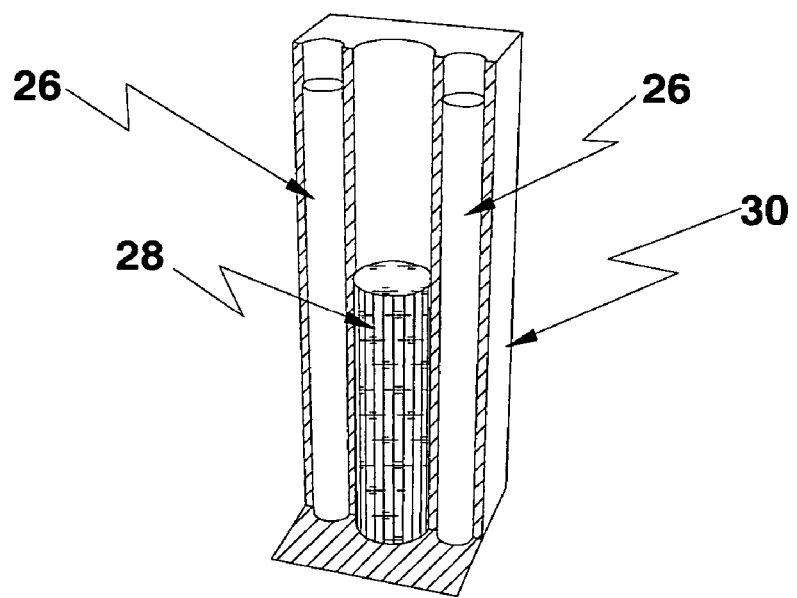
FIG. 4 is a drawing that shows a liquid level sensor according to the invention.

A liquid level sensor is depicted in FIG. 4. In its simplest form this phenomenon can be applied to sensing the levels of liquids. As a hollow vertical tube 30 fills with liquid 28 it changes the dielectric constant between two or more electrodes 26 on either side of the tube and the level can be determined from that change. This embodiment has many uses, such as a rain gauge, fuel level detection, animal plant watering, and so forth.

Figure 5A:
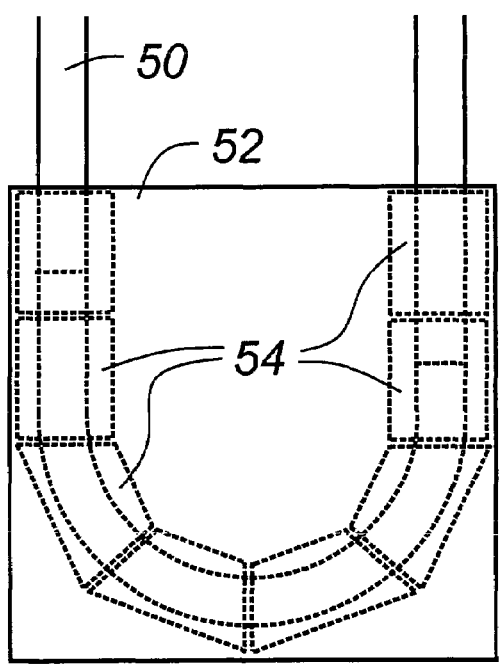
FIG. 5A illustrates a manometer constructed in accordance with the invention that uses electrode plates.
Figure 5B:
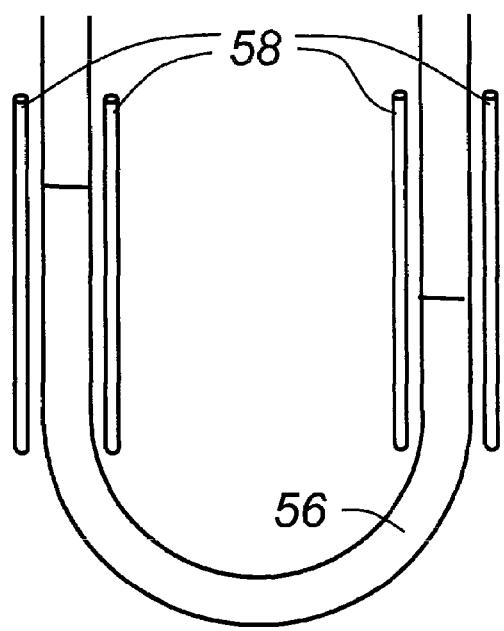
FIG. 5B illustrates a manometer constructed in accordance with the invention that uses elongated electrodes.

A simple U-tube manometer pressure sensor is very easy to build according to the invention and finds application in measuring small pressures and fluid velocities. Since this technique makes it very simple to measure the fluid level it is very easy to measure the level in the manometer. As shown in FIG. 5A, the level in either or both arms of the manometer tube 50 may be measured with a non-segment electrode 52 spaced apart from a segmented electrode 54 or rods/wires 58 may be supported on either or both arms of the tube 56 as shown in FIG. 5B.

We claim:

1. A position sensor, comprising:
a pair of spaced-apart electrodes;
an elongated, solid dielectric that moves between the electrodes; and
electrical circuitry interconnected to the electrodes to determine the absolute position of the dielectric relative to the electrodes as a function of the change in capacitance between the electrodes as the dielectric moves.

2. The position sensor of claim 1, wherein:
the electrodes are electrically conductive rods or wires; and
the dielectric is an electrically non-conductive rod or wire.

3. The position sensor of claim 1, wherein the dielectric is stiff or flexible.

4. The position sensor of claim 1, wherein the dielectric and the electrodes are substantially parallel to one another.

5. The position sensor of claim 1, wherein:
the spaced-apart electrodes are concentric tubes; and
the dielectric is an electrically non-conductive tube slideably disposed between the electrodes.

6. The position sensor of claim 1, wherein:
the dielectric is a liquid contained in a curved tube;
one of the electrodes is segmented; and
the other electrode is non-segmented.

* * * * *